Figure 1:
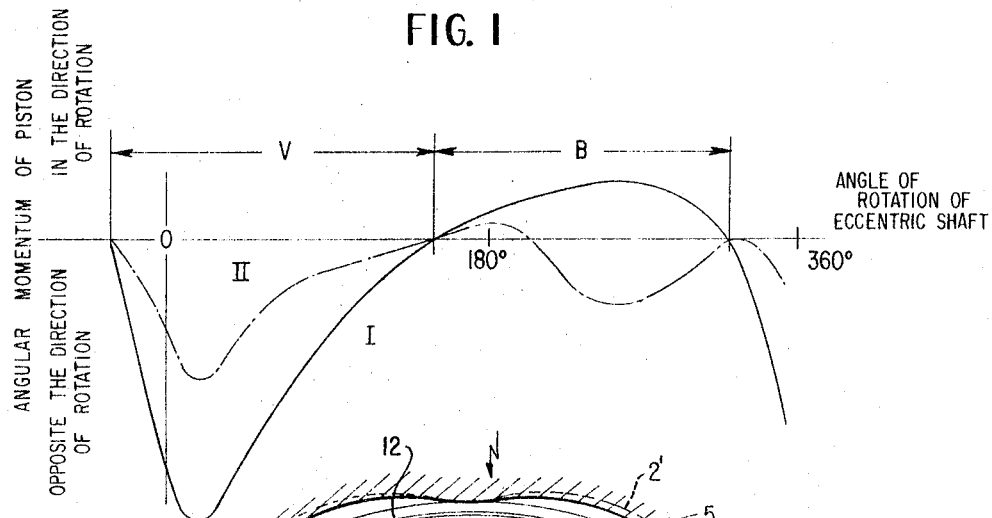

Sept. 6, 1966 R. EHRHARDT 3,270,720
ROTARY PISTON INTERNAL COMBUSTION ENGINE
Filed March 2, 1964 2 Sheets-Sheet 1

INVENTOR.
RICHARD EHRHARDT
BY *Dicke & Craig*
ATTORNEYS.

Sept. 6, 1966  R. EHRHARDT  3,270,720
ROTARY PISTON INTERNAL COMBUSTION ENGINE
Filed March 2, 1964  2 Sheets-Sheet 2
FIG. 4
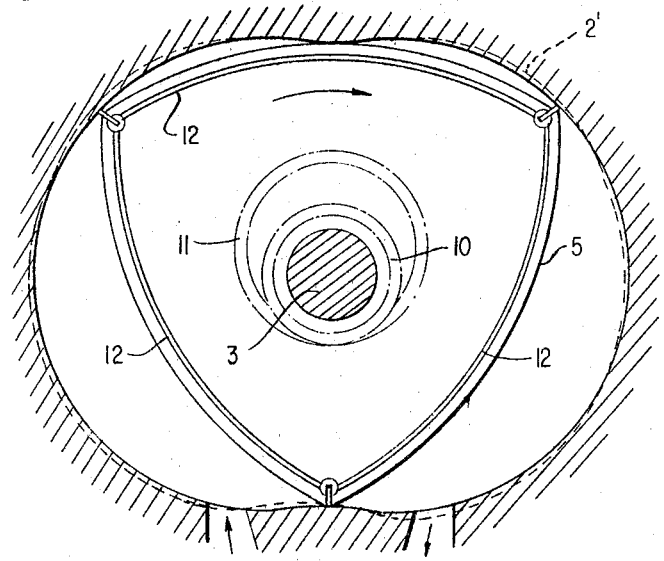
FIG. 5
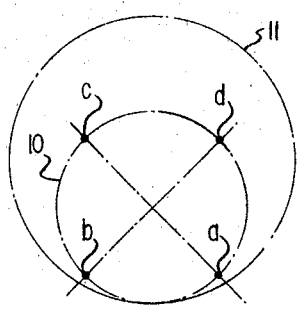
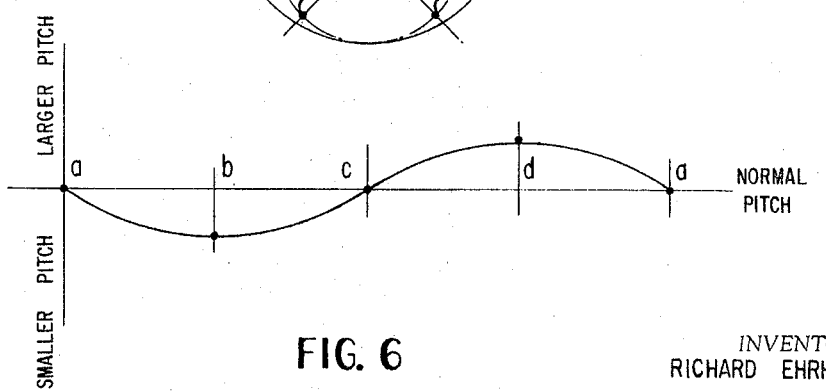
FIG. 6
INVENTOR.
RICHARD EHRHARDT
BY *Dicke & Craig*
ATTORNEYS.

United States Patent Office

3,270,720
Patented Sept. 6, 1966

3,270,720
ROTARY PISTON INTERNAL COMBUSTION ENGINE
Richard Ehrhardt, Stuttgart-Unterturkheim, Germany, assignor to Daimler-Benz Aktiengesellschaft, Stuttgart-Unterturkheim, Germany
Filed Mar. 2, 1964, Ser. No. 348,730
Claims priority, application Germany, Mar. 9, 1963, D 41,086
12 Claims. (Cl. 123—8)

The present invention relates to a rotary piston internal combustion engine of trochoidal construction with a stationary or rotating casing having an internal cam surface which defines together with lateral housing parts an internal space, through which extends substantially perpendicularly to the lateral housing parts an eccentric shaft on the eccentric of which is rotatably supported a polygonal piston whose rotational speed is at a predetermined ratio to the rotational speed of the eccentric shaft by means of a transmission.

In the operation of rotary piston internal combustion engines of this type, an angular momentum of the piston is produced essentially by the degree of irregularity or non-uniformity of the flywheel and piston mass which acts both against the direction of rotation of the piston as well as in the direction of rotation of the piston and which is responsible for an irregular or non-uniform angular velocity of the piston. This non-uniform angular velocity of the piston is very disadvantageous for the internal combustion engine; for the transmission for the control of the piston rotation is exposed thereby to considerable loads and stresses. The present invention is concerned with the task to convert the alternate angular momentum as much as possible into an angular momentum in only one direction with smaller maximum values so that the piston reaches an approximately equal angular velocity, or stated differently, that the piston assumes only a driven position over as large as possible a driving range. As a result thereof, any play in the transmission is also unable to have any effect on the piston itself or on the abutment of the radial vane-like sealing members against the groove flanks thereof so that chatter marks at the inner surfaces of the casing or housing do not occur.

With internal combustion engines having transmissions for the control of the piston which consist of a trochoidally-shaped cam track arranged at the lateral parts or end faces of the piston and of guide rollers moving along this cam track and arranged at the end face of the piston or at the lateral parts, the present invention as solution to the underlying problem essentially consists in that the cam track deviating from the trochoidal shape is flattened at predetermined places and at other places is raised in order to achieve at these places a deceleration and acceleration, respectively, of the piston and therewith as uniform as possible an angular velocity.

With internal combustion engines having a gear transmission which consists of a pinion rigid at a lateral part and of a hollow gear rigid with an end face of a piston, the present invention as solution to the underlying problem essentially consists in that the pinion is provided at predetermined places with a smaller pitch and at other places with a larger pitch than the pitch normally provided in order to achieve at these places a deceleration and acceleration, respectively, of the piston and therewith as uniform as possible an angular velocity.

According to a further feature of the present invention, the inner cam surfaces of the casing or housing may be corrected deviating from the trochoidal shape and correspondingly to the correction of the transmission. This feature also contributes to the fact that the sealing members at the corners of the piston are not constrained into movements which lead to damages at the sealing members themselves or at the cam surfaces in the form of chatter marks at the latter.

Accordingly, it is an object of the present invention to provide a rotary piston internal combustion engine of trochoidal construction which avoids by simple means the aforementioned disadvantages and shortcomings encountered in the prior art constructions.

It is another object of the present invention to provide a rotary piston internal combustion engine of trochoidal construction which operates with significantly improved uniformity in the angular velocity thereof.

A further object of the present invention resides in the provision of a rotary piston internal combustion engine of trochoidal construction which is provided with means that are simple as well as relatively inexpensive to minimize and equalize as much as possible the angular moments occurring within engines of the type mentioned above.

Still another object of the present invention resides in the provision of a rotary piston internal combustion engine of the type described above in which wear of the seal and cam tracks along which slide the seals is greatly reduced by operationally reliable means.

Another object of the present invention resides in the provision of a rotary piston internal combustion engine of the type described above in which uncontrollable movements of the radial seals leading to premature wear are at least greatly minimized if not completely eliminated.

Figure 2:
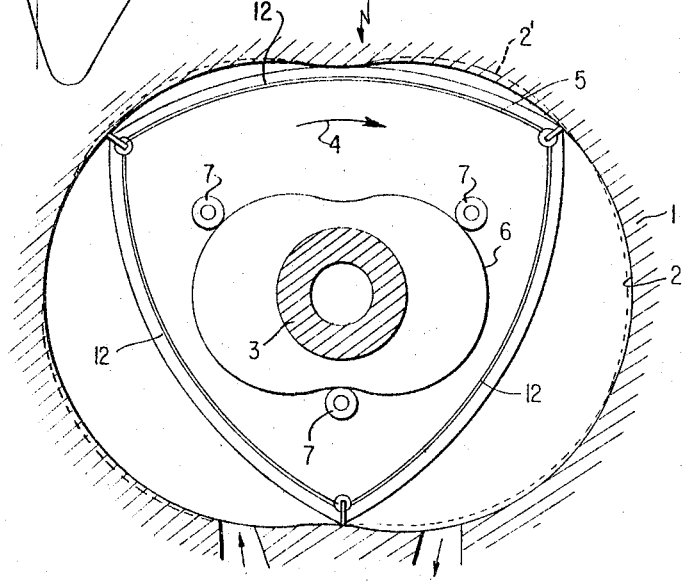
Figure 3:
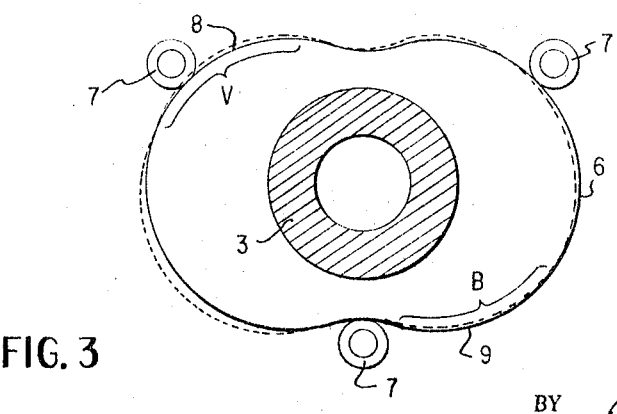

These and other objects, features and advantages of the present invention will become more obvious from the following description when taken in connection with the accompanying drawing which shows, for purposes of illustration only, two embodiments in accordance with the present invention, and wherein FIGURE 1 is a diagram in which the angular momentum of the piston of a rotary piston internal combustion engine of trochoidal construction is plotted against the angle of rotation of the eccentric shaft of the engine, FIGURE 2 is a partial somewhat schematic cross sectional view through a rotary piston internal combustion engine of trochoidal construction in accordance with the present invention in which a generated surface in the form of a cam track is provided as transmission for the control of the piston along which the piston is guided by means of guide rollers, FIGURE 3 is a somewhat schematic partial view, similar to FIGURE 2 and on an enlarged scale, of a corrected cam track for the control of the piston in accordance with the present invention, FIGURE 4 is a partial somewhat schematic cross sectional view through a modified embodiment of a rotary piston internal combustion engine of trochoidal construction in accordance with the present invention in which a pinion rigid with the housing and a hollow gear rigid with the piston are provided as transmission for the control of the piston, FIGURE 5 is a schematic view, on an enlarged scale, of the transmission of FIGURE 4 with an indication of the areas at the pinion in which a correction of the pitch takes place, and FIGURE 6 is a diagram for the correction of the pitch of the pinion of FIGURE 5.

Referring now to the drawing wherein like reference numerals are used throughout the various views to designate like parts, and more particularly to FIGURE 1, during operation of a rotary piston internal combustion engine of trochoidal construction according to the embodiments of FIGURES 2 and 4, an angular momentum of the piston can be noticed for a certain rotational speed, which plotted against the angle of rotation of the eccentric shaft corresponds to the curve I of FIGURE 1. The curve I extends within the area between 0° of angle of rotation of the eccentric shaft, with the piston in the upper dead center position thereof, to about 150° of angle of rotation in a direction opposite the direction of rotation of the piston, that is, the angular momentum is negative, which means the piston has to be driven within that region. In the region between 150° and 330° of angle of rotation, the piston has a positive angular momentum, that is the piston has to be braked. This alternate angular momentum according to curve I indicates that the transmission for the control of the piston is exposed to considerable loads and stresses with which the play in the transmission becomes noticeable in a disadvantageous manner, and that the sealing members at the piston corners are set into uncontrollable movements leading to damages at the surfaces of the casing or housing.

In order to achieve at least an approximately uniform angular velocity of the piston for purposes of eliminating these disadvantages, the present invention contemplates a correction of the transmission in such a manner that a deceleration of the piston is initiated by the transmission within the range V of the angle of rotation of the eccentric shaft and an acceleration of the piston within the range B of the angle E of rotation of the eccentric shaft. An angular momentum of the piston results therefrom which follows curve II. Since this angular momentum becomes positive only within a small range of the angle of rotation and with relatively small values, a relatively uniform angular velocity of the piston may be expected.

With the internal combustion engine according to FIGURE 2 which essentially consists of the casing or housing 1 having a two-arched internal cam surface 2 and of a triangular piston 5 rotating on the eccentric shaft 3 in the direction of arrow 4, transmission for the control of the piston 5 is formed by a two-arched cam track 6 secured at a lateral part of the housing and by three guide rollers 7 which are supported at one of the end faces of the piston 5 and roll off along the cam track 6.

In order to attain for the piston 5 during its rotation in the direction of arrow 4 relative to the eccentric shaft 3 an angular momentum that is as much as possible of the same sign according to curve II of FIGURE 1 and therewith an angular velocity that is as much as possible in the same sense, the cam track 6 is corrected according to FIGURE 3, deviating from the original trochoidal shape as indicated by the dash lines, in such a manner that at certain places flat portions 8 are provided in relation to the original trochoidal shape and at other places raised portions 9 in relation thereto. Within the area of the flattened portions 8 there occurs a deceleration of the piston whereas within the area of the raised portions 9 there occurs an acceleration of the piston so that the curve II of FIGURE 1 results for the angular momentum of the piston and therewith an approximately uniform angular velocity of the piston. The ranges V and B in the schematic diagram of FIGURE 1 are indicated in FIGURE 3 by brackets. The guide rollers 7 carry out a positive support function within these ranges.

With the internal combustion engine according to FIGURE 4 which is constructed like the engine of FIGURE 2 except with respect to the transmission for the control of the piston 5, the transmission thereof consists of a pinion 10 disposed concentrically to the eccentric shaft 3 and secured at a lateral part of the housing and of a hollow gear wheel 11 meshing with this pinion 10 which is arranged concentrically to the piston 5 at the end face thereof. In order to decelerate the piston in relation to its rotation at certain places and accelerate the same at other places, the pinion 10 is provided with a pitch differing from the initially laid-out pitch in such a manner that the pinion 10, as shown in FIGURE 6, has at the places $a$ and $c$ the original pitch while at the place $b$ deviating therefrom it has a smaller pitch and at the place $d$ a larger pitch. The changes in pitch are gradual and continuous.

Corresponding to the correction in the transmission for the control of the piston, the inner cam surfaces 2 of the casings or housings 1 are also corrected with the engines according to FIGURES 2 and 4. The uncorrected cam surfaces are designated in FIGURES 2 and 4 by reference numeral 2'. The correction takes place thereby at the same places and in the same sense as the correction at the cam track 6 according to FIGURE 3. Advantageously, a tool is utilized for the realization of the correction at the inner cam surfaces or for the manufacture of the corrected inner cam surfaces which is provided with a transmission according to FIGURE 3 or 5. As a result of the correction of the inner cam surfaces, the vane-like or bar-like sealing members 12 located at the corners of the piston 5 are not forced into movements which would lead to damages at the sealing members 12 themselves or at the cam surfaces.

In order to eliminate completely the fact that with the configuration of curve II recognizable from FIGURE 1 the angular momentum does not have the same sign throughout, it suffices to press the sealing bars or strips 12 of the piston against the housing surface by means of stronger springs. A larger friction results therefrom which becomes effective as if the ordinate of FIGURE 1 had been displaced parallel to the illustrated position thereof in the direction of angular momentum in the sense of rotation of the piston. As a result thereof, the output which is attainable with an angular momentum configuration according to curve II as contrasted to that according to curve I is reduced only slightly.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the oppended claims.

I claim:
1. A rotary piston internal combustion engine comprising:
   casing means having internal cam surface means which together with the lateral casing parts define an internal space,
   eccentric shaft means extending through said space substantially perpendicularly to the lateral casing parts and being provided with eccentric means,
   polygonal piston means rotatably arranged on said eccentric means and provided with seal means at the piston corners thereof,
   transmission means for controlling the rotary speed of said piston means in relation to the angular velocity of said eccentric shaft means,
   and means for improving the uniformity of angular velocity of the piston means including means in said transmission means for imparting at predetermined places decelerations and accelerations to the piston means.

2. A rotary piston internal combustion engine comprising:
   casing means having internal cam surface means which together with the lateral casing parts define an internal space,
   eccentric shaft means extending through said space substantially perpendicularly to the lateral casing parts and being provided with eccentric means,
   polygonal piston means rotatably arranged on said eccentric means and provided with seal means at the piston corners thereof,
   transmission means for controlling the rotary speed of said piston means in relation to the angular velocity of said eccentric shaft means,
   and means for improving the uniformity of angular velocity of the piston means including means in said transmission means for imparting at predetermined places decelerations and accelerations to the piston means, and said internal cam surface means being provided with corrections substantially corresponding in effect to the corrections in the transmission means.

3. A rotary piston internal combustion engine comprising:

housing means having internal cam surface means which together with the lateral housing parts define an internal space, eccentric shaft means extending through said space substantially perpendicularly to the lateral housing parts and being provided with eccentric means, polygonal piston means rotatably arranged on said eccentric means and provided with seal means at the piston corners thereof, transmission means for controlling the rotary speed of said piston means in relation to the angular velocity of said eccentric shaft means including cam track means secured at one of the two parts consisting of a piston end face and a lateral housing part and guide roller means secured at the other of said two parts, said cam track means being provided with flattened and raised portions at predetermined places deviating from the trochoidal shape thereof to impart decelerations and accelerations to the piston means for improving the uniformity of the angular velocity thereof.

4. A rotary piston internal combustion engine comprising:

housing means having internal cam surface means which together with the lateral housing parts define an internal space, eccentric shaft means extending through said space substantially perpendicularly to the lateral housing parts and being provided with eccentric means, polygonal piston means rotatably arranged on said eccentric means and provided with seal means at the piston corners thereof, transmission means for controlling the rotary speed of said piston means in relation to the angular velocity of said eccentric shaft means including cam track means secured at one of the two parts consisting of a piston end face and a lateral housing part and guide roller means secured at the other of said two parts, said cam track means being provided with flattened and raised portions at predetermined places deviating from the trochoidal shape thereof to impart decelerations and accelerations to the piston means for improving the uniformity of the angular velocity thereof, and the internal cam surface means being provided with corrections corresponding to the corrections in the transmission means.

5. A rotary piston internal combustion engine comprising:

housing means having internal cam surface means which together with the lateral housing parts define an internal space, eccentric shaft means extending through said space substantially perpendicularly to the lateral housing parts and being provided with eccentric means, polygonal piston means rotatably arranged on said eccentric means and provided with seal means at the piston corners thereof, and transmission means for controlling the rotational speed of the piston means in relation to the eccentric shaft means including pinion means secured to a lateral housing wall part and hollow gear means meshing with said pinion means and secured to an end face of the piston means, the pitch of the pinion means being decreased and increased at certain places to impart to the piston means decelerations and accelerations, respectively, thereby to improve the uniformity of the angular velocity thereof.

6. A rotary piston internal combustion engine comprising:

housing means having internal cam surface means which together with the lateral housing parts define an internal space, eccentric shaft means extending through said space substantially perpendicularly to the lateral housing parts and being provided with eccentric means, polygonal piston means rotatably arranged on said eccentric means and provided with seal means at the piston corners thereof, and transmission means for controlling the rotational speed of the piston means in relation to the eccentric shaft means including pinion means secured to a lateral housing wall part and hollow gear means meshing with said pinion means and secured to an end face of the piston means, the pitch of the pinion means being decreased and increased at certain places to impart to the piston means decelerations and accelerations, respectively, thereby to improve the uniformity of the angular velocity thereof, and the internal cam surface means being effectively provided with corrections substantially coresponding to the corrections in the transmission means.

7. In a rotary piston internal combustion engine of trochoidal construction having a housing provided with an internal cam surface which together with the lateral housing parts defines an interior space through which extends an eccentric shaft on the eccentric of which is rotatably supported a polygonal piston, the rotational speed of which is at a predetermined ratio to the rotational speed of the eccentric shaft by means of a transmission, and in which as transmission is used a trochoidally shaped cam track at one of the two parts consisting of the lateral housing parts and end faces of the piston and guide rollers rolling along the cam track and arranged at the other of the two parts, the improvement essentially consisting of a cam track flattened at predetermined places in deviation from the trochoidal shape and raised at other places in deviation from the trochoidal shape in order to achieve at these places a deceleration and acceleration of the piston.

8. In a rotary piston internal combustion engine of trochoidal construction having a housing provided with an internal cam surface which together with the lateral housing parts defines an interior space through which extends an eccentric shaft on the eccentric of which is rotatably supported a polygonal piston, the rotational speed of which is at a predetermined ratio to the rotational speed of the eccentric shaft by means of a transmission, and in which as transmission is used and in which as transmission is provided a gear transmission including a pinion rigid with a lateral housing part and a hollow gear rigid with an end face of the piston and meshing with said pinion, the improvement essentially consisting of a pinion which has at certain places a smaller pitch and at other places a larger pitch than the normally provided pitch in order to attain at these places a deceleration and acceleration of the piston, respectively.

9. In a rotary piston internal combustion engine of trochoidal construction having a housing provided with an internal cam surface which together with the lateral housing parts defines an interior space through which extends an eccentric shaft on the eccentric of which is rotatably supported a polygonal piston, the rotational speed of which is at a predetermined ratio to the rotational speed of the eccentric shaft by means of a transmission, and in which as transmission is used a trochoidally shaped cam track at one of the two parts consisting of the lateral housing parts and end faces of the piston and guide rollers rolling along the cam track and arranged at the other of the two parts,
  the improvement essentially consisting of a cam track flattened at predetermined places in deviation from the trochoidal shape and raised at other places in deviation from the trochoidal shape in order to achieve at these places a deceleration and acceleration of the piston,
  the inner cam surfaces of the housing being also corrected corresponding to the correction of the transmission in deviation from the trochoidal shape.

10. In a rotary piston internal combustion engine of trochoidal construction having a housing provided with an internal cam surface which together with the lateral housing parts defines an interior space through which extends an eccentric shaft on the eccentric of which is rotatably supported a polygonal piston, the rotational speed of which is at a predetermined ratio to the rotational speed of the eccentric shaft by means of a transmission, and in which as transmission is used and in which as transmission is provided a gear transmission including a pinion rigid with a lateral housing part and a hollow gear rigid with an end face of the piston and meshing with said pinion,
  the improvement essentially consisting of a pinion which has at certain places a smaller pitch and at other places a larger pitch than the normally provided pitch in order to attain at these places a deceleration and acceleration of the piston, respectively,
  the inner cam surfaces of the housing being also corrected corresponding to the correction of the transmission in deviation from the trochoidal shape.

11. In a rotary piston internal combustion engine of trochoidal construction having an envelope provided with an internal cam surface which together with the lateral parts thereof defines an interior space through which extends an eccentric shaft on the eccentric of which is rotatably supported a polygonal piston the rotational speed of which held at predetermined ratio to the rotational speed of the eccentric shaft by means of a transmission,
  the improvement essentially consisting of means in said transmission for equalizing non-uniformities in the piston mass to improve the uniformity in angular velocity of the piston.

12. In a rotary piston internal combustion engine of trochoidal construction having an envelope provided with an internal cam surface which together with the lateral parts thereof defines an interior space through which extends an eccentric shaft on the eccentric of which is rotatably supported a polygonal piston the rotational speed of which held at predetermined ratio to the rotational speed of the eccentric shaft by means of a transmission,
  the improvement essentially consisting of means in said transmission for equalizing non-uniformities in the piston mass to improve the uniformity in angular velocity of the piston including means for effectively providing an angular momentum of the piston during normal operation which has substantially only one sign.

No references cited.

MARK NEWMAN, *Primary Examiner.*

F. T. SADLER, *Assistant Examiner.*